US008954854B2

(12) United States Patent
Järvinen et al.

(10) Patent No.: US 8,954,854 B2
(45) Date of Patent: Feb. 10, 2015

(54) METHODS AND APPARATUS FOR SOUND MANAGEMENT

(75) Inventors: Kari Juhani Järvinen, Tampere (FI); Antti Eronen, Tampere (FI); Juha Henrik Arrasvuori, Tampere (FI); Roope Olavi Järvinen, Lempäälä (FI); Miikka Vilermo, Siuro (FI)

(73) Assignee: Nokia Corporation, Espoo (FI)

( * ) Notice: Subject to any disclaimer, the term of this patent is extended or adjusted under 35 U.S.C. 154(b) by 68 days.

(21) Appl. No.: 13/489,829

(22) Filed: Jun. 6, 2012

(65) Prior Publication Data

US 2013/0332837 A1    Dec. 12, 2013

(51) Int. Cl.
*G06F 3/16* (2006.01)

(52) U.S. Cl.
CPC ........................................ *G06F 3/16* (2013.01)
USPC .......................................................... 715/727

(58) Field of Classification Search
CPC .......................................................... G06F 3/16
USPC .......................................................... 715/727
See application file for complete search history.

(56) References Cited

U.S. PATENT DOCUMENTS

| 5,715,318 | A  | * | 2/1998  | Hill et al. ...................... 381/300 |
| 7,812,826 | B2 |   | 10/2010 | Ording et al. .................. 345/173 |
| 8,060,582 | B2 | * | 11/2011 | Bliss et al. .................... 709/218 |
| 2011/0137437 | A1 | * | 6/2011 | Jonsson ........................ 700/94 |
| 2011/0153043 | A1 |   | 6/2011 | Ojala .............................. 700/94 |
| 2012/0284619 | A1 | * | 11/2012 | Myllyla et al. ................ 715/716 |

FOREIGN PATENT DOCUMENTS

WO    WO-2007/099318 A1    9/2007

OTHER PUBLICATIONS

Bredies, K. et al.; "The Multi-Touch SoundScape Renderer"; downloaded from the Internet, Mar. 6, 2012, http://www.google.co.in/url?sa=t&rct=j&q=The+Multi-Touch+SoundScape+Renderer+&source=web&cd=2&ved=0CEYQFjAB&url=http%3A%2F%2Faudio.qu.tu-berlin.de%2Fwp-content%2Fuploads%2Fpublications%2F2008%2Fbredies08_multitouch_SSR_AVI.pdf&ei=f1ZUT-DjGo6yrAe6n-XPDQ&usg=AFQjCNEI7NLfBfi4vJuvK_GtnnQVWHTXyw whole document (4 pages).

McGregor, I. et al.; "Soundscape Mapping: A Tool for Evaluating Sounds and Auditory Environments"; The 16th International Conference on Auditory Display (ICAD-2010), Jun. 9, 2010; whole document (8 pages).

(Continued)

*Primary Examiner* — Amy Ng
*Assistant Examiner* — Roland Casillas
(74) *Attorney, Agent, or Firm* — Harrington & Smith

(57) ABSTRACT

Systems and techniques for location based sound management. Information associated with a display is defined or selected based on user inputs and sounds associated with responsive locations of the display. Defining of the information associated with the display may be based at least in part on user touches to a touch screen display. Parameters for playback are also selected, such as a number of audio channels, based on user inputs that may similarly comprise user touches to the touch screen display. Playback parameters may be changed during playback based on user inputs occurring during playback.

18 Claims, 11 Drawing Sheets

(56) References Cited

OTHER PUBLICATIONS

"Broadcastr: Listen to Location Based Audio Stories From Around The World"; downloaded from the Internet, Mar. 27, 2012; http://www.makeuseof.com/dir/broadcastr-location-based-audio/; whole document (2 pages) and video.

"Techno Soundscapes With Your Fingers"; downloaded from the Internet, Mar. 27, 2012; http://www.thecollectiveloop.com/2011/02/techno-soundscapes-with-your-fingers.html; whole document (2 pages) and video.

"What is UrbanRemix?"; downloaded from the Internet, Mar. 27, 2012; http://urbanremix.gatech.edu/; whole document (2 pages) and video.

* cited by examiner

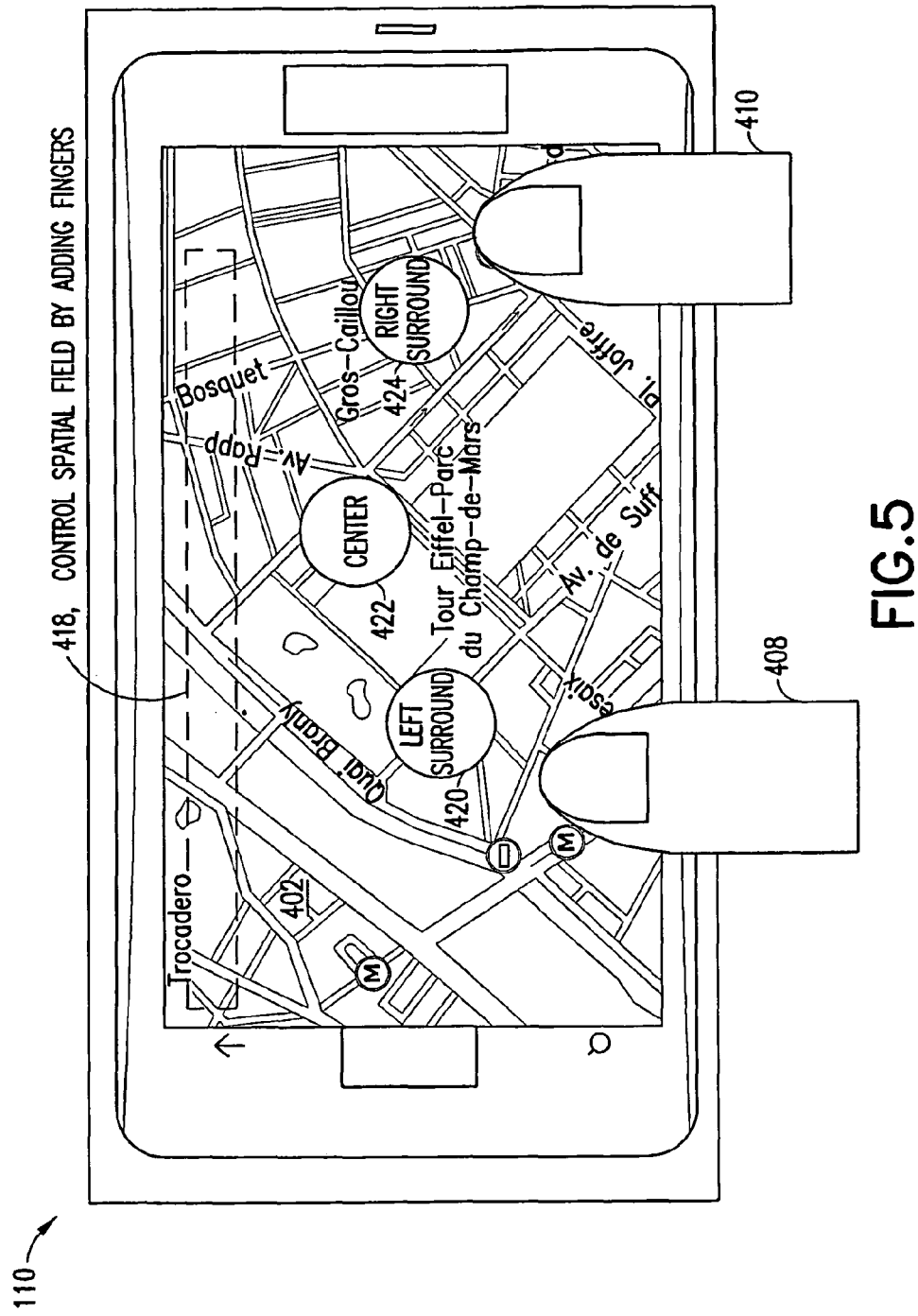

METHODS AND APPARATUS FOR SOUND MANAGEMENT

TECHNICAL FIELD

The present invention relates generally to control of sound characteristics. More particularly, the invention relates to systems and techniques for user control of the creation and playback of sounds through interactions with responsive locations of a display.

BACKGROUND

The ability of electronic devices to store and communicate information and associate information belonging to one category with information belonging to another category continues to grow. Many modern portable electronic devices are able to store maps covering the world, and, alternatively or in addition, receive map data from a provider. In many applications, map data may cover an area of any desired scope, from a local area surrounding the user, to the entire world. Devices may also store, or obtain from communication networks, associated information relating to points of interest, such as video and sound data. Users who are traveling are able to capture a wide variety of data using their portable electronic devices and other mechanisms, and many map providers allow users to upload information relating to items of interest that they have encountered. Such information may include photographs, moving video, and sound.

SUMMARY

According to one embodiment of the invention, an apparatus comprises at least one processor and memory storing computer program code. The memory storing computer program code is configured to, with the at least one processor, cause the apparatus to perform actions comprising at least at least one processor;
  memory storing computer program code;
  wherein the computer program code is configured to, with the memory and the at least one processor, cause the apparatus to at least determine at least one user interaction parameter associated with at least one responsive location of a display, wherein the display presents visual information comprising the at least one responsive location, determine an audio event associated with the at least one responsive location wherein the audio event is controlled based on the at least one user interaction parameter, and generate at least one audio signal. Output of the at least one audio signal is dependent on the audio event such that the at least one audio signal is associated with the at least one responsive location of the display.

According to another embodiment of the invention, a method comprises configuring at least one processor to at least determine at least one user interaction parameter associated with at least one responsive location of a display, wherein the display presents visual information comprising the at least one responsive location, determine an audio event associated with the at least one responsive location wherein the audio event is controlled based on the at least one user interaction parameter, and generate at least one audio signal. Output of the at least one audio signal is dependent on the audio event such that the at least one audio signal is associated with the at least one responsive location of the display.

According to another embodiment of the invention, a computer readable medium stores a program of instructions. Execution of the program of instructions by a processor configures an apparatus to at least determine at least one user interaction parameter associated with at least one responsive location of a display, wherein the display presents visual information comprising the at least one responsive location, determine an audio event associated with the at least one responsive location wherein the audio event is controlled based on the at least one user interaction parameter, and generate at least one audio signal. Output of the at least one audio signal is dependent on the audio event such that the at least one audio signal is associated with the at least one responsive location of the display.

DETAILED DESCRIPTION

Figure 1:
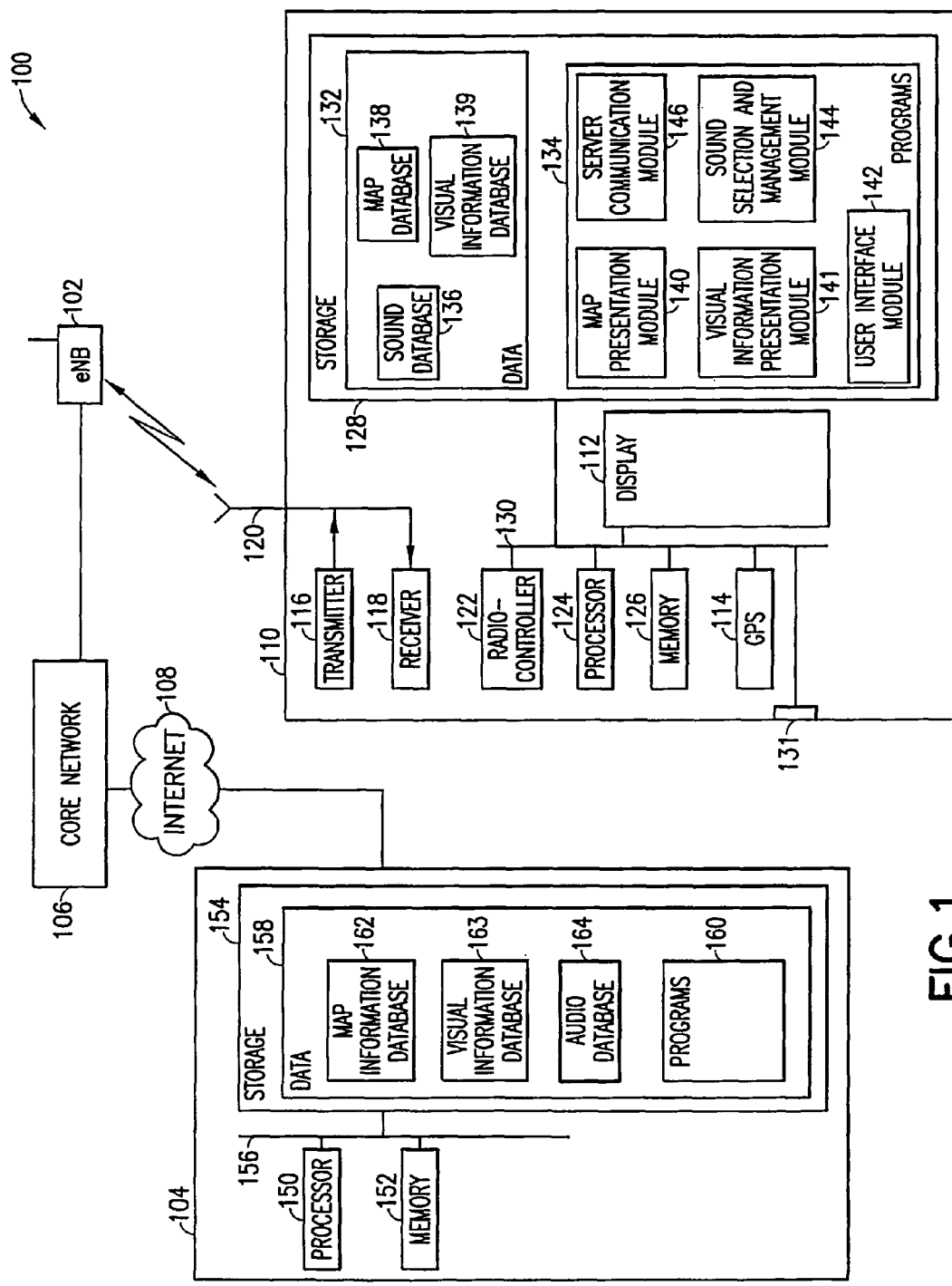
FIG. 1 illustrates a wireless network according to an embodiment of the present invention.

Embodiments of the present invention recognize that a great deal of audio information is or can be associated with geographic locations and can be stored in or communicated to user devices along with visual information that can be presented using a display. One useful association of audio information with visual information is the association of audio information with visual information identifying a geographic location. Such visual information may be, for example, map information. Other visual information may take the form of photo galleries and video information. Photo galleries can, for example, be associated with accompanying audio information and video information, such as moving images, can be associated with music or a soundtrack, such as in the case of a movie.

The great profusion of audio information can render it difficult to manage. Audio information can enhance a user's experience of, for example, a geographic location, such as a city, but the selection and playback of the audio information needs to be made simple for the user if it is to enhance, rather than detract from, the user's experience. Many user devices are relatively small, with small display screens, and user interface mechanisms for selection and playback of sounds need to allow the user to generally specify the sounds to be played back, and the manner in which they are to be played back, without a need to sort through a great deal of selection information.

At least one embodiment of the present invention therefore provides mechanisms for a simple user interface that displays visual information, such as a map view, and responds to at least one user interaction with the display, for example, determining at least one user interaction parameter. The at least one user interaction parameter may be associated, for example, one or more touches of a touch screen display. The view presented by the display may be associated with sound information, such as sound files or available streaming sounds. In the case of a map view presenting a geographic area, each element of the sound information may be associated with a specific point in the geographic area or in a subregion of the geographic area, and an audio event may be determined based on the at least one user interaction parameter. A user may make interactions, such as providing simple touch inputs, to determine an audio event. The audio event may, for example, identify, define, or specify sounds or sound components that are to be included in an audio signal. The audio event may also define characteristics of the sounds that are to be included in the audio signal, such as absolute and relative sound levels, the number of channels to be included in the audio signal, the allocation of sounds or sound components to channels, or other relevant parameters. An audio signal may be understood as a signal that may comprise sound information such as representations of recorded, created, or synthesized sounds, and inclusion of a sound in an audio signal may be understood to comprise configuration of the audio signal so that a reproduction of the sound can be produced when the audio signal is provided to suitable playback equipment. An audio signal may be provided to sound playback equipment to cause the playing of sounds represented by the audio signal.

Numerous user interaction parameters may be use to configure audio events, and different parameters may configure different types of events. For example, touches by the user may be interpreted to select a specific sound associated with a geographic point, or to define the boundaries of a geographic area whose associated sounds are to be included in the audio signal. Alternatively or in addition, user touches may be interpreted to control the manner of in which a sound or sounds based on the audio signal are to be played, such as by defining the number of channels to be played, such as stereo or 5.1, or defining parameters of spatial audio playback. In addition, user touches may be interpreted to allow for specific user selections of sounds, such as music suited to the ambient sounds being played. It will be recognized that user interfaces such as touch screen displays are frequently designed or configured to respond not only to touches of an object, such as a user's finger or a stylus, but by an approach of the object sufficiently close to the user interface so that its proximity will be recognized by the device. The device may respond to the proximity of the object in the same way as it would to an actual touch of the object. When the word "touch" is used herein to refer to a touch of a user interface device such as a touch screen display by an object, it will be recognized that the word "touch" is interpreted to include approaches by an object sufficiently near to the interface device that the interface device will respond to the proximity of the object.

FIG. 1 illustrates a wireless network 100 according to an embodiment of the present invention. The wireless network may comprise a base station, suitably implemented as an eNodeB (eNB, an evolved NodeB, which is a long term evolution, (LTE) base station) 102. The eNB 102 may communicate with a server 104. The server 104 may be associated with a service provider that furnishes map and other visual information, and associated sound data, for users. The server 104 may receive and store user sound uploads together with information associating the sound uploads with geographical locations and other visual information that may be associated with sounds and sound information. The server 104 may make uploads by one user available to other users. The server 104 may store map data and other visual data as well as sound data associated with locations. The eNB 102 may communicate with the server 104 through a core network 106, possibly using the public Internet 108 as an intermediary. The eNB 102 may receive data from the server 104 for delivery to user devices (UEs) such as the exemplary UE 110. A single eNB 104 and UE 110 are presented in the present example, but it will be recognized that a typical deployment will include numerous eNBs and serve numerous UEs, and a single server 104 may serve a number of wireless networks controlled by different operators.

The UE 110 includes a display 112, which may be a touch screen display, and may also include navigation elements such as a global positioning system (GPS) module 114. The UE 110 comprises a transmitter 116, receiver 118, antenna 120, and radiocontroller 122. The UE 110 further comprises a processor 124, memory 126, and storage 128, communicating with one another and with the radiocontroller over a bus 130. The UE 110 further comprises an audio port 131.

The UE 110 employs data 132 and programs 134, suitably residing in storage 128 and transferred to memory 126 as needed for use by the processor 124. The data 132 may include a sound database 136, a map database 138, and a visual information database 139. The visual information may comprise information such as photo galleries, video clips, movies and other audiovisual entertainment with soundtracks that can be used in embodiments of the present invention, and other visual and audio information. The sound database 136, the map database 138, and the visual information database 139, may include map, audio, and still and moving video data, that is stored long term or downloaded as needed. The sound database 136 may include location tags and other location identifying information that can be correlated with geographic location information included in the map data. The programs 134 may include a map presentation module 140 that presents the map data based on, for example, the location of the device as determined by the GPS module 114. The programs 134 may further include a visual information presentation module 141, that presents other visual information such as still or moving video. The map presentation module 140 may include audio file information, such as playback icons, in its presentation of the map data, allowing a user to see the associated locations of sounds available for selection, and the visual information presentation module 141 may include its own audio file information. Such audio file information may include audio files, or links to audio files, relating to sounds accompanying still images or soundtracks of moving images.

The programs 134 may also include a user interface module 142, providing mechanisms by which a user is able to designate location information for sounds that are to be played and to further designate a manner of playback. For example, the user may make multiple simultaneous interactions with a touch screen interface to designate a boundary for a geographic area whose associated sounds are to be presented. The interactions may be actual touches to the interface, or approaches to the interface sufficiently near for the interface to recognize a contact. Interactions may be made to one or more responsive locations of the interface, where a responsive location is a portion of the interface presenting visual information indicating that an interaction will be interpreted to determine sound information. For example, a responsive location may include visual information indicating generally that interactions will determine sound information in predetermined ways, such as by defining a geographic location with which sounds are to be associated or accepting an indication of a number of channels for sound playback, or may be interpreted as indicated by the responsive location. For example, a responsive location may present an icon indicating a sound associated with a specific geographic point. Sound information may be referred to, for example, as an audio event. An audio event may include a recording or playback operation, and a user interaction with a responsive location of the display may determine parameters of an audio event. For example, a user interaction may designate a number of channels for recording or playback, or may indicate a geographic location whose ambient sounds are to be recorded or whose associated sounds are to be played back.

To take another example of user interactions with the touch screen interface, once the boundary for the geographic area has been defined, the user inputs may be interpreted differently, so that the number of touches on the display 112 specifies the number of playback channels, such as one touch for monaural, one touch for stereophonic, or five touches for 5.1 surround. During or after the number of channels has been designated, movement of an object touching the display, such as a user's finger, may designate a sound level for a channel. For example, if a user is touching the display 112 with five fingers to designate 5.1 surround, a movement of the user's leftmost finger may designate an increase or decrease in the sound level for the left surround channel. The programs 134 may further comprise a sound selection and management module 144, selecting and formatting appropriate sounds for playback based on information provided by the user interface module 142, the sound database 136, the map database 138. The sound selection and management module may, for example, select sounds to be presented based on any of various appropriate criteria. For example, if a user defines a boundary of a geographic area, sounds associated within the area encompassed by the boundary may be so numerous that playing all of them will not provide a satisfactory user experience. In such a case, therefore, the sound selection and management module 144 may select available sounds based on factors such as popularity, appropriateness for the season or time of day, user preferences, and the like. The sound selection and management module 144 may also, as discussed in additional detail below, control a sound field for sound playback based on user inputs. The sound selection and management module 144 may also control sound recording, such as recording of ambient sounds. Such control may be based, for example, on user inputs specifying directions from which sounds are to be recorded, gains of different recording channels, and the like.

For convenience, the network 100 is herein described as communicating with the server 104 to receive map and audio information for user devices, but it will be recognized that storage and distribution of map and audio information may be accomplished in any way desired. For example, map data may be locally stored on board user devices and audio data may be distributed on demand, map data and audio data may be locally stored on board user devices, map data and audio data may comprise both data locally stored on board user devices and data distributed from a central repository, map and audio data may be stored on board user devices and periodically updated using data from a central repository. Numerous other mechanisms for providing map and audio data to user devices and making such data available to users may be employed.

The central server 104 comprises a processor 150, memory 152, and storage 154, communicating over a bus 156. The storage 154 hosts data 158 and programs 160. The data 158 may include a map information database 162, a visual information database 163, and an audio database 164. The visual information may comprise information such as photo galleries, video clips, movies and other audiovisual entertainment with soundtracks that can be used in embodiments of the present invention, and other visual and audio information. The audio database 164 comprises a plurality of sound elements, which may be prerecorded sound files, music files, links to captured ambient sounds, such as live sounds captured by a microphone, and the like. Each of the sound elements may be associated with a geographic location or region. For example, information defining each sound element may include a tag defining a geographic location. A tag may, for example, include a set of geographic coordinates, such as latitude and longitude, and may identify a sound element to a specific point or to a larger or smaller region, such as a city or a neighborhood. For example, a tag may include coordinates specifically identifying a point, or may include a set of coordinates defining a range. The UE 110 may receive map data from the server 104 based on its location or on user selections, such as scrolling the map away from the user's location. The map data may present visual icons indicating links to audio elements, or alternatively or in addition, links to audio elements may be present in the map information database 162 or the server 104 may coordinate a geographical area selected by a user with audio elements stored in the audio database 164 to define audio elements associated with the selected geographical area. The UE 110 may also receive visual data from the server 104, for example, based on geographic location information, or taken from the visual information database 163, and one or more embodiments of the present invention may be used to control audio characteristics of audio or audiovisual information associated with or taken from the visual data.

Figure 2A:
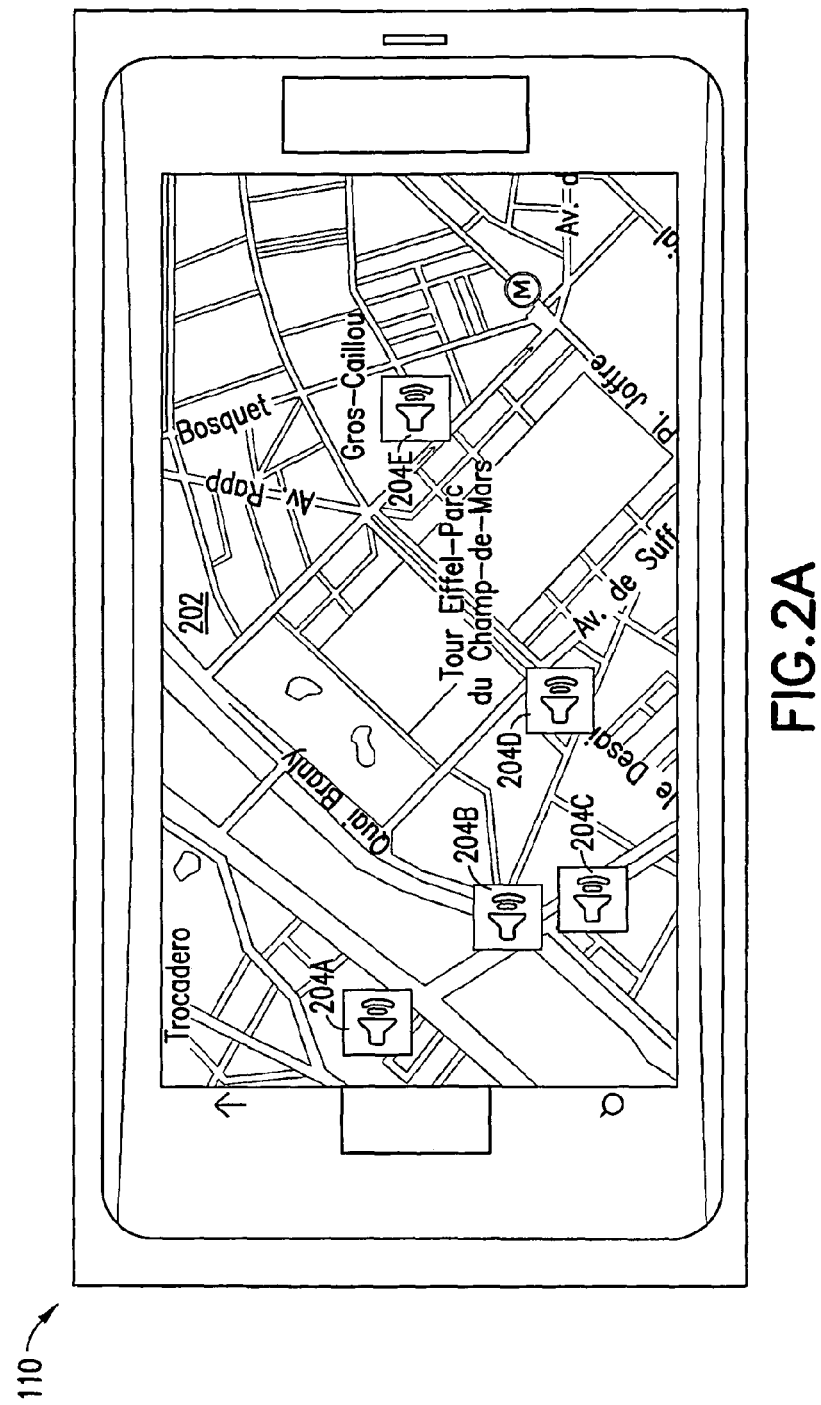
FIGS. 2A-2C; 3A, 3B, 4A, 4B, and 5-7 illustrate aspects of user inputs and actions performed in response to the user inputs, of embodiments of the present invention.
Figure 2B:
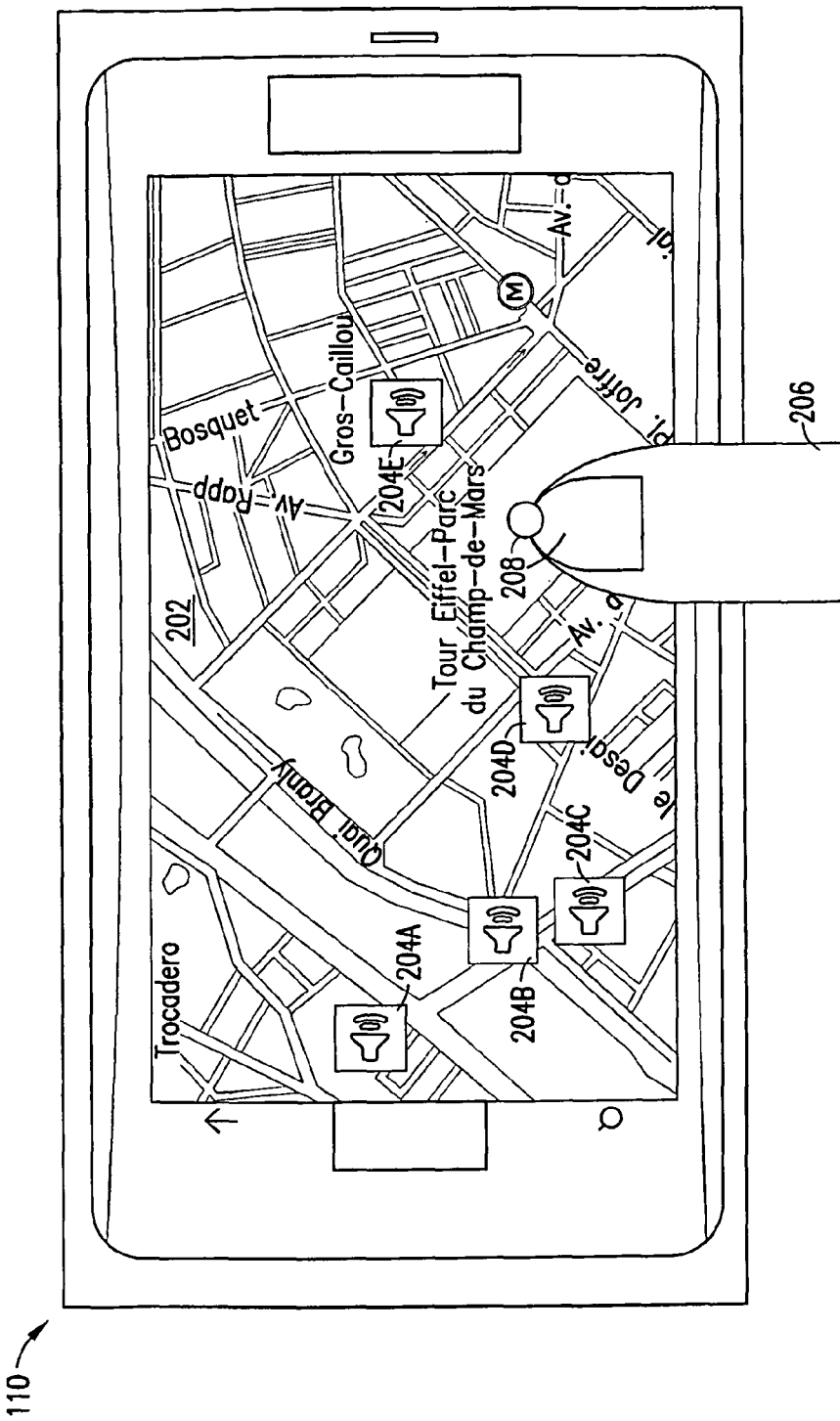
Figure 2C:
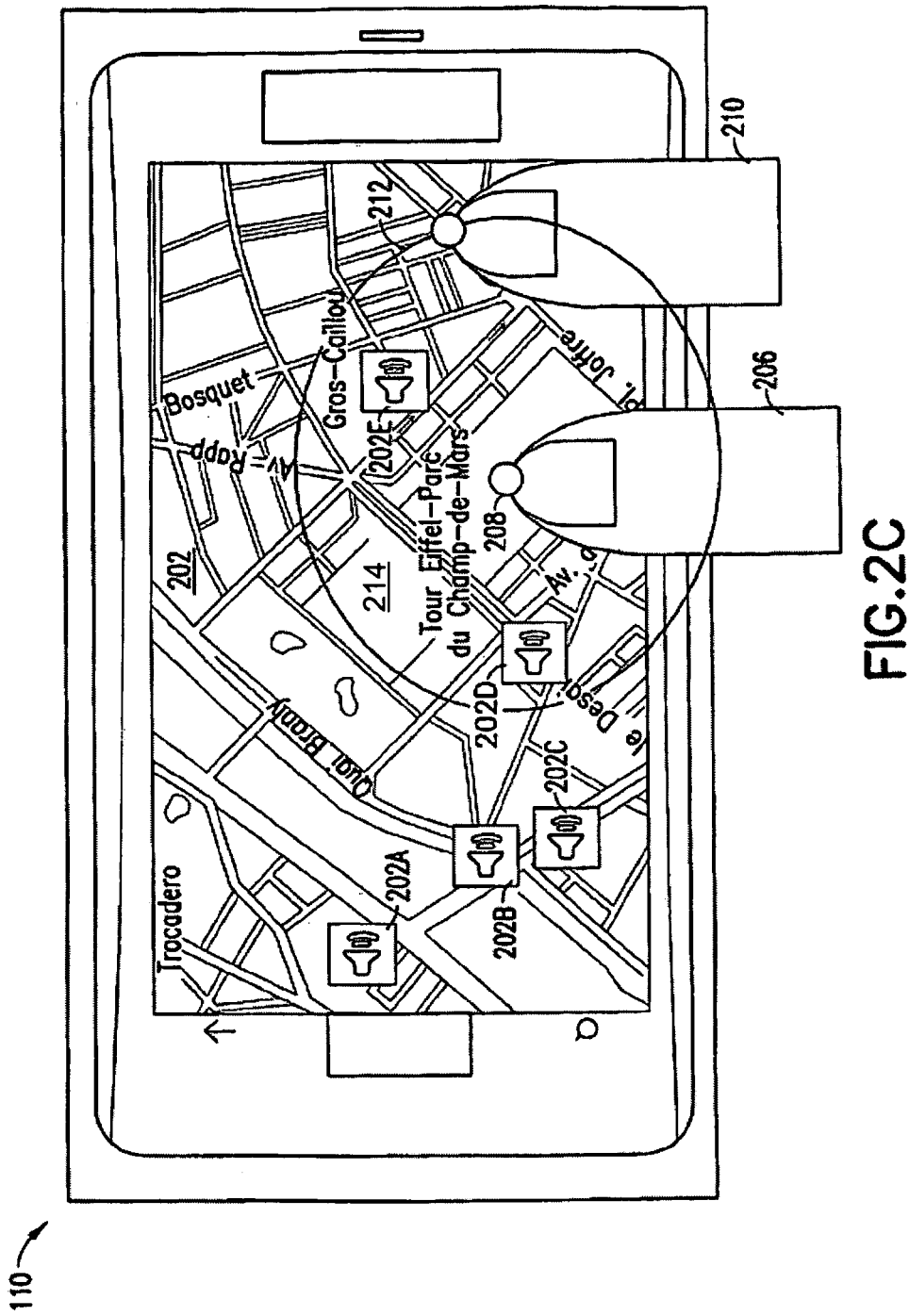

FIGS. 2A-2C illustrate a view of the UE 110, showing a map display 202 with sound icons 204A-204E. A user may select a specific sound icon for playback through a touch, or may define a geographic boundary by defining a center of an area by a first touch, as can be seen in FIGS. 2B and 2C. FIG. 2C also shows the user as defining the center of an area by the first touch, and also shows the user as defining an outer boundary of the area by a second touch. The user's first finger 206 defines the center 208 and the user's second finger 210 defines the outer boundary 212, of an area 214. The user interface module 152 may suitably be configured to adapt the defining of boundaries to different categories of user inputs. In the presently illustrated example, because the module 152 detects a touch by two fingers, the user's fingers 206 and 210 define an ellipse by specifying the center and the horizontal radius of the ellipse. A touch by three fingers might define a triangle, with the vertices of the triangles at the touched locations, a touch by four fingers might define a square or rectangle, and so on. The sound selection and management module 144 may examine the sound database 136 and the map database 138 to identify available sounds associated with the bounded area, also invoking the server communication module 146 as appropriate to retrieve map and sound information from the server 104, such as by sending coordinate information, such as latitude and longitude, to the server 104.

In at least one embodiment of the invention, the sound database 136, the map database 138, and the visual information database 139, may be omitted, or may serve as a repository for data which is stored only temporarily after being retrieved from the server 104, so that sounds are identified and retrieved from the server 104 as needed. The selected sounds may be only a portion of the sounds associated with the bounded area, and may include, for example, a specified number of sounds, with the specific selection being random or variable. The selection may alternatively be based on specific criteria, such as popularity among other users, preferences of the current user, and so on.

Figure 3A:
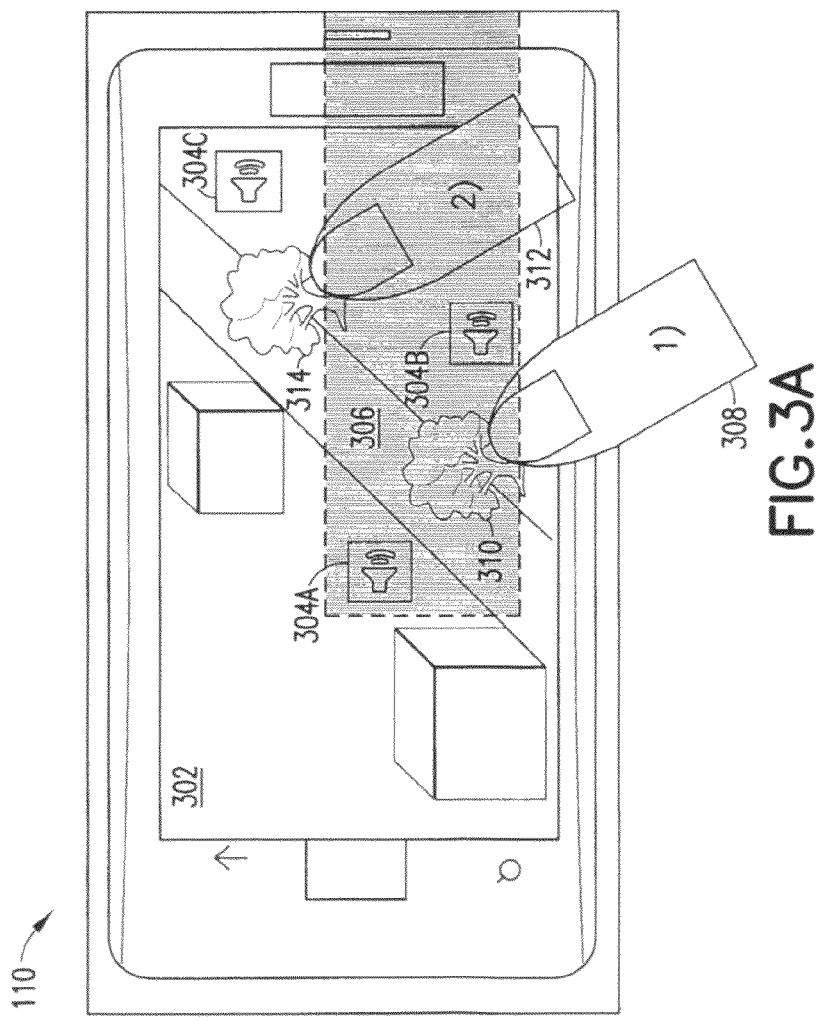
Figure 3B:

FIG. 3A illustrates the UE 110, presenting an alternative display 302. The sound icons 304A, 304B, and 304C are presented, with the map display 302 being presented in three-dimensional format. The user is defining a three-dimensional space 306 by using a first finger 308 to touch a first object (in this case a tree) 310, and using a second finger 312 to touch a second object (another tree) 314. The objects 310 and 314 are separated in three-dimensional space, and the user interface module 142 defines the three-dimensional area 306 based on the separation. The area 306 encompasses the sound icons 304A and 304B. A two-dimensional format of the display 302 is presented in FIG. 3B, presenting a map view of the area 306.

In addition to selecting sounds, embodiments of the present invention also manage the playback of sounds, providing the user with a simple, intuitive interface for selection of the number of channels to be used, the levels of one or more channels, the width of the sound field, and other factors. For example, the user interface module 142 may recognize the number of simultaneous touches and the sound selection and management module 144 may determine the number of channels to be used based on the number of touches. Such an interpretation of user inputs may be performed after the inputs for sound selection have been recognized. That is, user touches may be interpreted to determine the area whose associated sounds are to be selected, and then the interpretation of user touches may be changed so that touches govern aspects of sound formatting such as playback channels or sound levels. For example, a UE such as the UE 110 may be capable of providing a 5.1 sound field, with the channels being a left front channel L, a right front channel R, a center channel C, a subwoofer channel S, a left surround channel LS, and a right surround channel RS. The number of touches of the display 112 may be interpreted to determine the number of channels. For example, one touch may indicate monaural sound, two touches may indicate stereo sound from L and R, three touches may indicate a three-channel sound, such as stereo and C, stereo and S, or stereo and a mixture of RS and LS. In such a case, the particular option chosen may be based on a previous configuration, or may be selected in response to further questions presented to the user. A combination of four touches may be interpreted to indicate, for example, stereo and two separate rear channels LS and RS, or stereo, a subwoofer S, and a mixed rear channel. A combination of five touches may be interpreted as indicating full 5.1 sound.

Figure 4A:
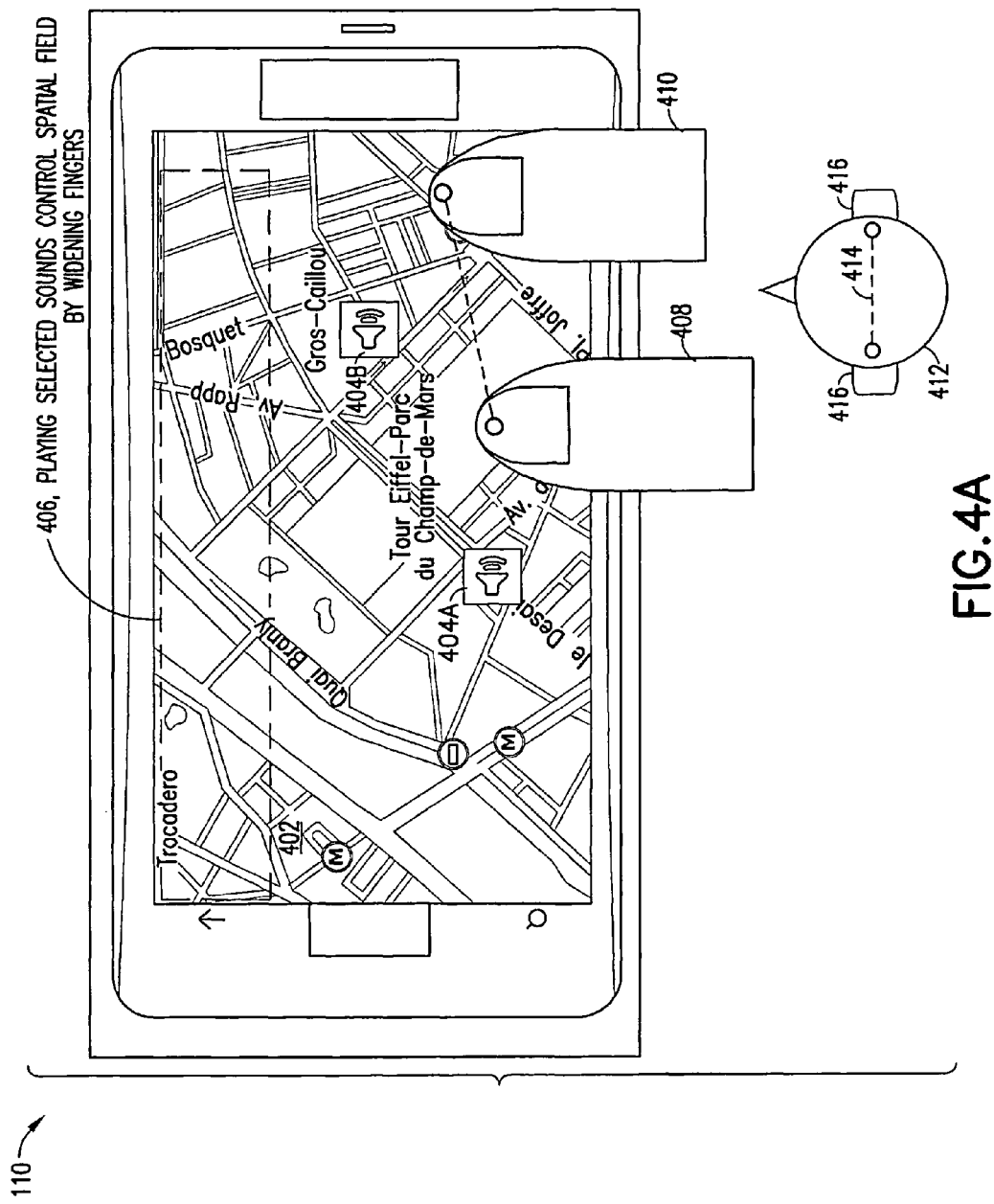
Figure 4B:
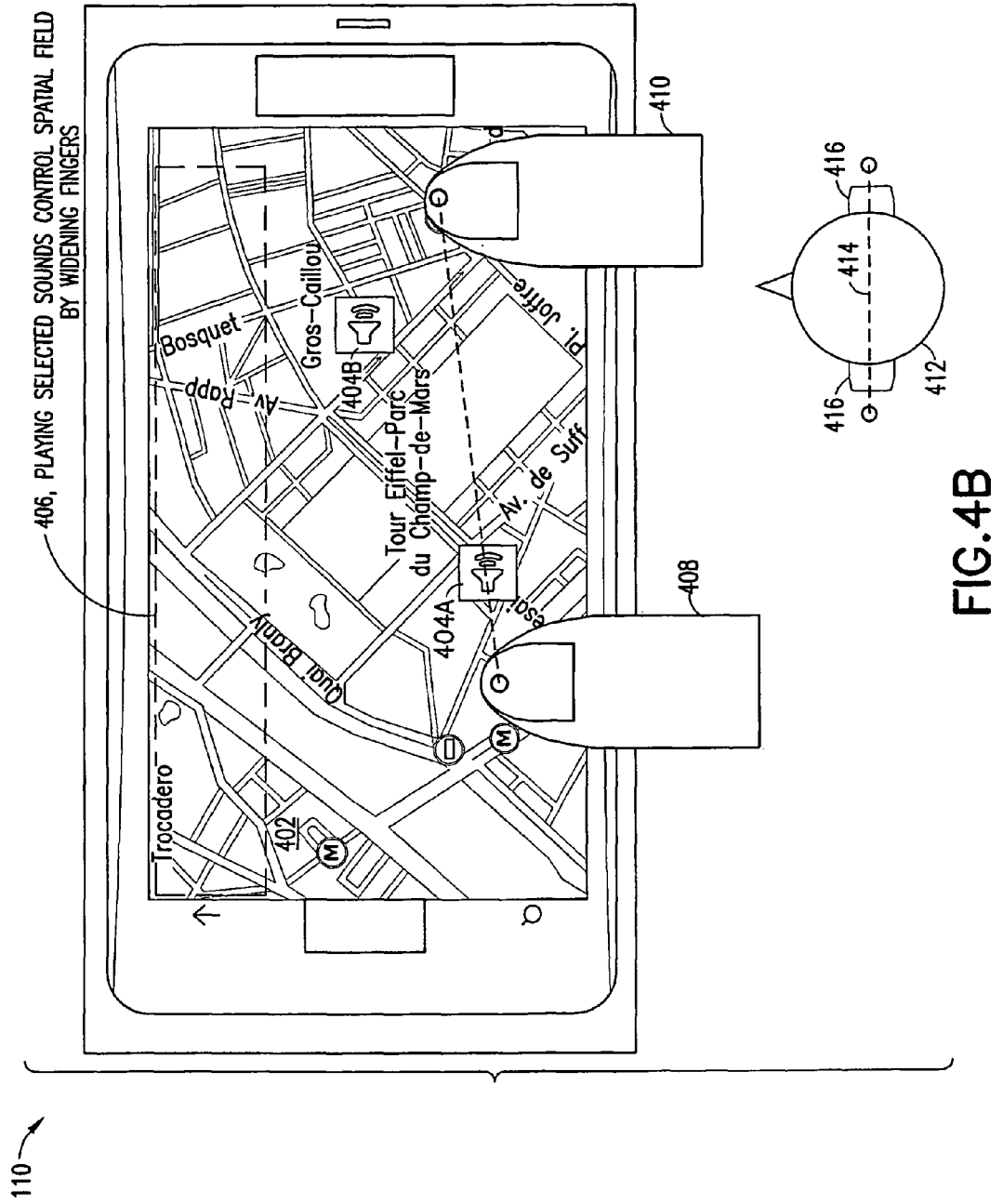

In addition to selecting the number of channels, touches and movement of touches may be interpreted to determine the extent of a sound field. For example, after channel selection and before or during stereo playback, a user may touch the display 112 and move his or her fingers together or apart to widen or narrow the sound field. FIGS. 4A and 4B illustrate such a scenario, presenting a display 402 by the UE 110. The icons 404A and 404B are visible, indicating the sounds being played back, and an instructional notation 406 is presented when the user interface module 142 is configured to recognize inputs to narrow or widen the sound field, such as during stereo playback. A user's first and second fingers 408 and 410 are seen touching the display 402, and a representation of the user 412 and a sound field perceived by the user through headphones 416 is presented. Widening the separation of the fingers 408 and 410, as occurs from FIG. 4A to FIG. 4B, can be seen to widen the sound field 414. In addition or as an alternative to widening or narrowing the sound field, selecting the number of channels, or determining other properties or characteristics of a sound or combination of sounds, user inputs can be made to create sounds associated with the inputs. For example, a user might move his or her finger on a map to create scrubbing sounds, or drag the map as a whole to create scrubbing sounds.

It will be recognized that control of sounds and selection of channels may be accomplished not merely with respect to sounds associated with map information, but with respect to any sound information that can be presented using the UE 110 or another suitable device. For example, if a user is watching a movie, the sound track can be controlled using appropriate ones of the mechanisms described above. For example, rather than presenting a geographic location, a UE such as the UE 110 can allow the user to select a soundtrack of a movie being watched, or can simply default to selection of the soundtrack. User interactions directed to selecting or increasing or decreasing the number of channels can cause audio information such as a movie soundtrack to be changed or adapted based on the user interactions.

Figure 6:
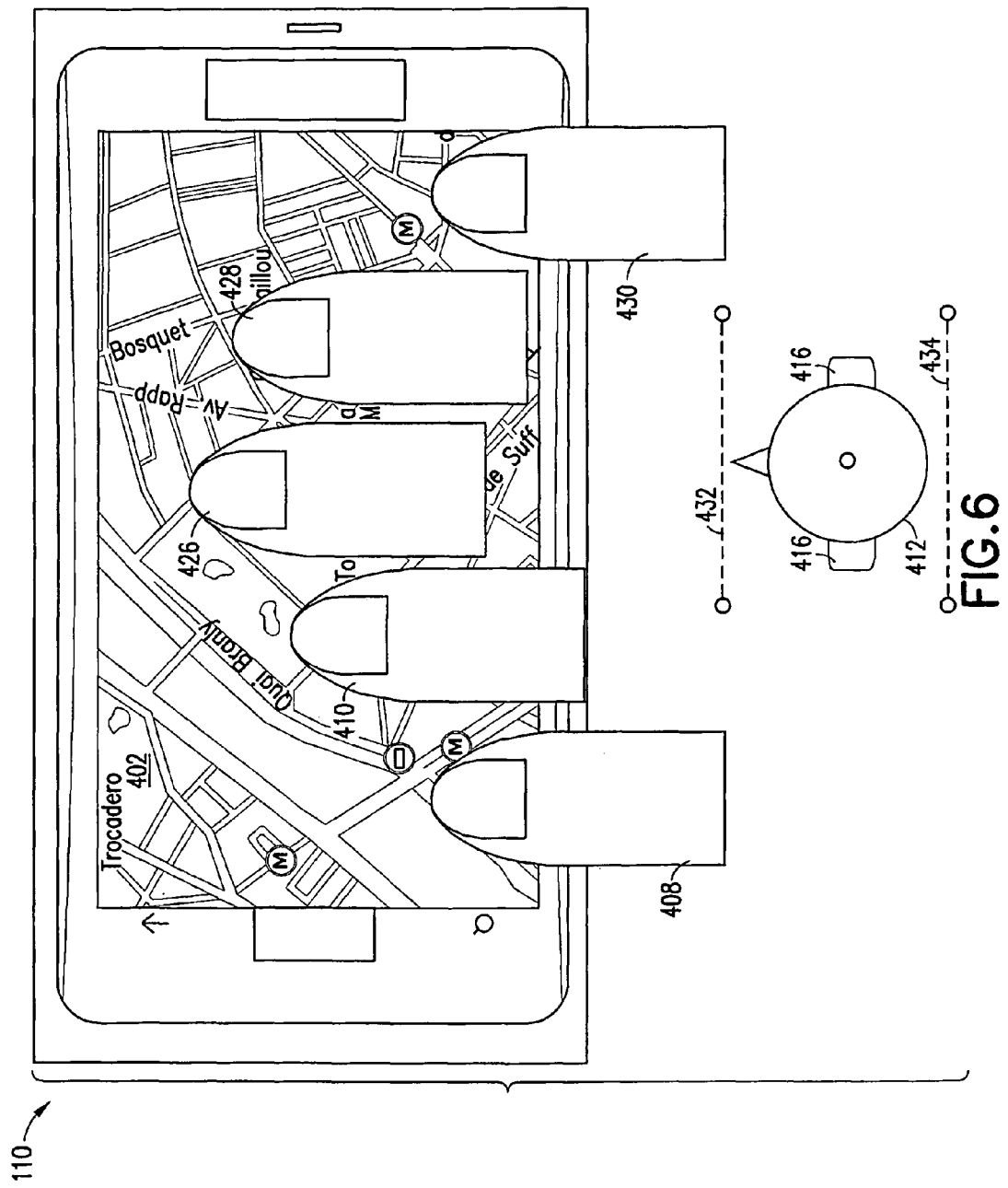

FIG. 5 illustrates the UE 110 presenting another stage of the display 402, during which the user interface module 142 is configured to recognize addition of audio channels. The user is at present illustrated as having placed two fingers 408 and 410 on the display 402 to select two channels. Appropriate instructions 418 are provided, and icons 420, 422, and 424 represent left surround, center, and right surround channels available to be added. FIG. 6 illustrates the UE 110 presenting the display 402, with the user's fingers 408, 410, 426, 428, and 430 being placed on the display 402 to control a 5.1 surround sound field. The positioning of the fingers 408, 410, 426, 428, and 430 may approximately define apparent relative speaker locations.

The user 412 is shown, perceiving a sound field through the headphones 416. The sound field comprises a front field 432 and a rear field 434. In one or more embodiments of the invention, levels can be changed through up or down movements, and positioning of channels can be changed through moving one or more fingers along, for example, an apparent arc defined by the finger positioning. In one embodiment of the invention, movement of a finger from side to side may be interpreted to move the apparent position of the sound channel corresponding to the finger. When the user moves several fingers simultaneously, the apparent position of several audio channels may be modified. For example, if the user has five fingers touching the screen, and the fingers are rotated nearly simultaneously around an apparent circle defined by the finger positioning, all the channels and thus the whole sound field may be rotated into the direction defined by the finger movement.

Any of numerous approaches to presenting sounds may be employed, and any number of combinations of sounds for multichannel playback may be selected. For example, a prerecorded composite 5.1 sound presentation may be presented using a 5.1 sound field, or two-channel stereo may be presented using a stereo sound field.

In various embodiments of the invention, a number of channels are selected and sounds are chosen to fit the channels based on sound sources near a specified location, dispersed around the user, such as in a surround configuration, or selected by the user, either specifically, or according to user preferences.

For example, if the user places one finger on the display in order to specify a monaural sound, a sound may be provided by the server 112, for example, or taken from the database 148. If the user places two fingers on the display, sound components are selected for two stereo channels. The sound components may simply be components of multichannel sounds, may be selected from available monaural sounds, or may be downmixed from composite sounds. For example, two locations may have associated 5.1 sound fields. If the first location is designated location 1 and the second channel is designated location 2, then the channels may be designated as location 1 channels L1, R1, C1, Sub1, LS1 and RS1 and location 2 channels L2, R2, C2, Sub2, LS2, RS2. The overall sound field may be presented as:

One sound recording location on the right, another on the left:

$$L=L1+C1+\tfrac{1}{2}*R1$$

$$LS=LS1+RS1$$

$$C=\tfrac{1}{2}*R1+\tfrac{1}{2}*L2$$

$$R=\tfrac{1}{2}*L2+C2+R2$$

$RS = LS2 + RS2$ $Sub = Sub1 + Sub2$

One sound recording location at front, another in the back:

$L = L1 + LS1$ $R = R1 + RS1$ $C = C1$ $LS = L2 + LS2 + \frac{1}{2} * C2$ $RS = R2 + RS2 + \frac{1}{2} * C2$ $Sub = Sub1 + Sub2$ Channel amplitudes may be scaled to keep the overall energy of the spatial audio field unchanged.

As noted above, a touch with three or more fingers simultaneously indicates at least a three-channel presentation, which can be rendered as a full 360 degree multichannel recording. Sound components used for channels may be monaural sound clips or multichannel clips. For example, sounds may be selected that are associated with locations closest to the user's fingers as they fall on the display, and if these sounds are in monaural format, sounds may be selected and spatialized to corresponding positions corresponding to their map locations.

If sounds are in, for example, 5.1 format, spatial sounds may be downmixed and assigned to the respective channels. One approach is to make a monaural downmix of each spatial sound, and then assign the monaural downmixes to the respective channels. In another approach, one channel, such as the center channel, may be selected from each sound, and assigned to an appropriate channel.

For example, in one scenario, a narration in an audio story might be associated with a point of interest in a specified location, such as a castle. A user may select a sound file of this narration by placing his finger to that location. The user may then augment the audio story by placing additional fingers on the map to obtain ambient sounds from that environment.

Figure 7:
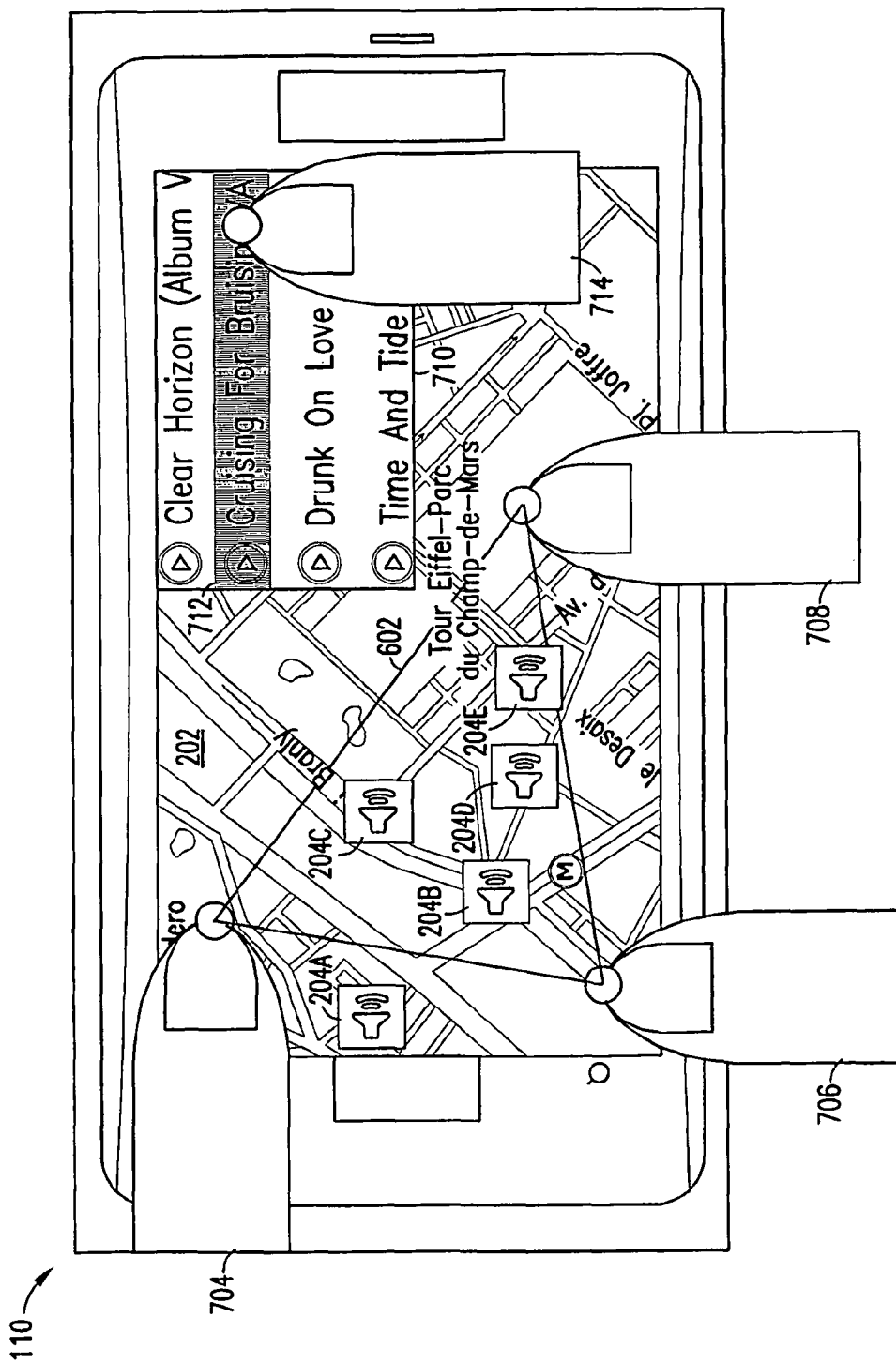

It will be recognized that a user device such as the UE 110 may provide numerous mechanisms for sound presentation, which may be invoked along with the playing of location-based sounds, as desired. For example, many devices such the UE 110 provide access to stored or streaming media, and a user may select such media for playback at the same time that location-based sounds are being selected. For example, FIG. 7 illustrates the UE 110, presenting the display 202, with the sound icons 204A-204E being presented and with the icons 204B-204E lying within a boundary 602 defined by touches of the user's fingers 704, 706, and 708. Also presented in the display 202 is a song menu 710, with the song 712 being selected by a touch of the user's finger 714. The song 712, or any other available media item that may be selected by the user, may be presented along with the location-based sounds associated with the icons 204A-204E, and the song 712 can thus be mixed in with ambient sounds associated with the environment.

Figure 8:
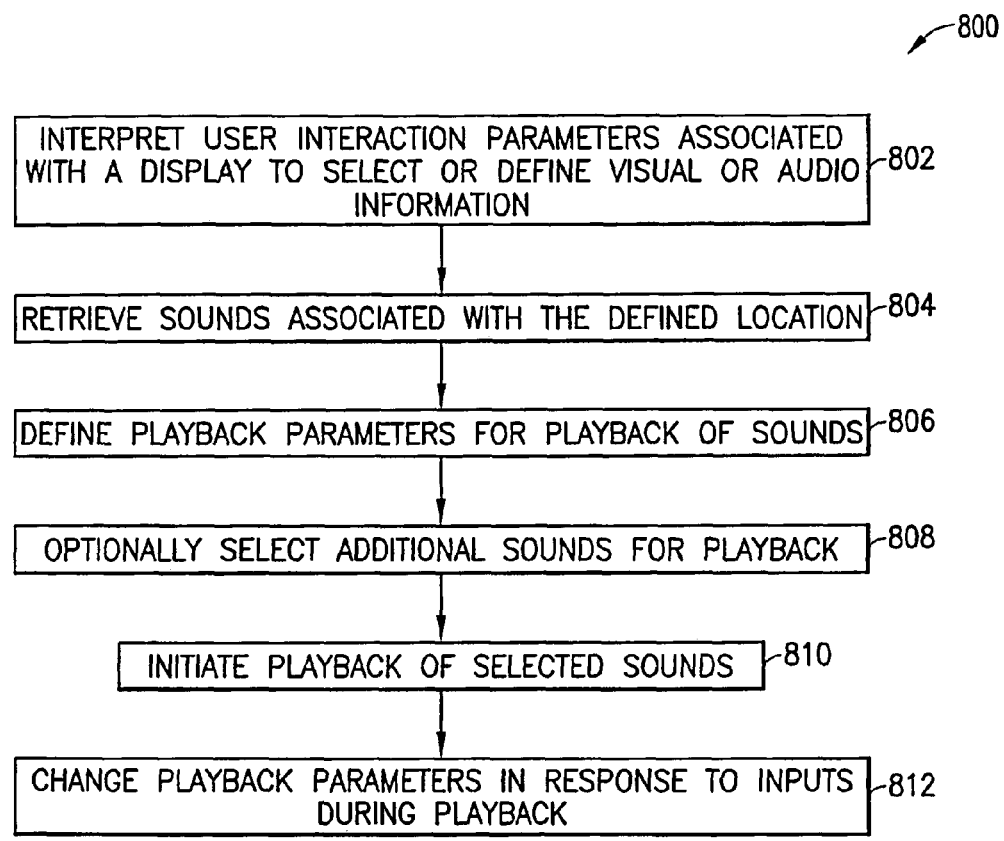
FIG. 8 illustrates a process according to an embodiment of the present invention.

FIG. 8 illustrates a process 800 of sound management according to an embodiment of the present invention. At step 802, user interaction parameters associated with a display are interpreted to define or select visual information presented by the display, or audio information that is or should be associated with visual information. For example, a geographic location may be defined according to user inputs, for selection of sounds associated with the location, or audio information may be selected to accompany visual information, or audio information that is already associated with visual information, such as a movie soundtrack, may be selected to be controlled using inputs to the display. The user interaction parameters may suitably relate to touches on a touch screen display. At step 804, audio information associated with the visual information is retrieved. At step 806, playback parameters for playback of the sounds are defined according to user inputs, with the user inputs suitably comprising multiple touches on the touch screen display. At step 808, additional sounds may be selected for playback. At step 810, playback of the selected sounds is initiated, and at step 812, playback parameters are changed according to user inputs.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
   at least one processor;
   memory storing computer program code;
   wherein execution of the computer program code by the at least one processor causes the apparatus to at least:
   determine at least one user interaction parameter associated with at least one responsive location of a display, wherein the at least one responsive location of the display defines a geographic area and wherein the display presents visual information comprising the at least one responsive location, and wherein the at least one user interaction parameter indicates at least one of a selected geographic point and a boundary of a the geographic area;
   determine an audio event associated with the at least one responsive location wherein the audio event is controlled based on the at least one user interaction parameter, wherein determining the audio event comprises including in the audio event at least one sound associated with the defined geographic area; and
   generate at least one audio signal dependent on the audio event such that the at least one audio signal is associated with the at least one responsive location of the display, and wherein the generated at least one audio signal comprises a number of channels corresponding to the determined at least one user interaction parameter, and wherein the number of channels is controlled based on the number of substantially simultaneous user interactions with the display.

2. The apparatus of claim 1, wherein the at least one responsive location of the display is a location providing a visual indication that an input to the responsive location is interpreted to determine the audio event.

3. The apparatus of claim 1, wherein the audio event is at least one of a recording operation and a playback operation.

4. The apparatus of claim 1, wherein the geographic area is defined as the selected geographic point.

5. The apparatus of claim 1, wherein the at least one sound associated with the defined geographic area comprises a specified maximum number of sounds.

6. The apparatus of claim 5, wherein the predefined maximum number of sounds are selected according to a specified ranking.

7. The apparatus of claim 1, wherein the at least one sound comprises at least one sound component and wherein the apparatus is further caused to up- and down-mix sound components as needed to allocate at least one sound component to each of the specified number of channels.

8. The apparatus of claim 1, wherein execution of the computer program code further causes the apparatus to allocate at the least one sound to at least one channel to create a soundscape having a dimension based on the at least one user interaction parameter.

9. The apparatus of claim 1, wherein execution of the computer program code further causes the apparatus to play a sound based on the audio signal and change at least one parameter for playing of the sound based at on the at least one user interaction parameter determined during playing of the sound based on the audio signal, wherein the at least one user interaction parameter is based on a user interaction with the at least one responsive location of the display.

10. A method comprising:
configuring at least one processor to cause an apparatus to at least:
determine at least one user interaction parameter associated with at least one responsive location of a display, wherein the at least one responsive location of the display defines a geographic area and, wherein the display presents visual information comprising the at least one responsive location, and wherein the at least one user interaction parameter indicates at least one of a selected geographic point and a boundary of a geographic area;
determine an audio event associated with the at least one responsive location wherein the audio event is controlled based on the at least one user interaction parameter; and
generate at least one audio signal dependent on the audio event such that the at least one audio signal is associated with the at least one responsive location of the display, and wherein the generated at least one audio signal comprises a number of channels corresponding to the determined at least one user interaction parameter and wherein the number of channels is controlled based on the number of substantially simultaneous user interactions with the display.

11. The method of claim 10, wherein the at least one responsive location of the display is a location providing a visual indication that an input to the responsive location will be interpreted to determine the audio event.

12. The method of claim 10, wherein the audio event is at least one of a recording operation and a playback operation.

13. The method of claim 10, wherein the geographic area is defined as the selected geographic point.

14. The method of claim 10, wherein the at least one sound associated with the defined geographic area comprises a specified maximum number of sounds.

15. The method of claim 14, wherein the predefined maximum number of sounds are selected according to a specified ranking.

16. The method of claim 10, wherein the at least one sound comprises at least one sound component and wherein the actions further comprise up- and down-mixing sound components as needed to allocate at least one sound component to each of the specified number of channels.

17. The method of claim 10, further comprising configuring the at least one processor to cause the apparatus to allocate the at least one sound to at least one channel to create a soundscape having a dimension based on the at least one user interaction parameter.

18. The method of claim 10, further comprising configuring the at least one processor to cause the apparatus to play a sound based on the audio signal and change at least one parameter for playing of the sound based at on at least one user interaction parameter determined during playing of the audio signal, wherein the at least one user interaction parameter is based on a user interaction with at least one responsive location of the display.

* * * * *